W. O. REW.
APPARATUS FOR TREATING LIQUIDS.
APPLICATION FILED AUG. 24, 1915. RENEWED FEB. 20, 1920.
1,336,655.
Patented Apr. 13, 1920.
3 SHEETS—SHEET 2.
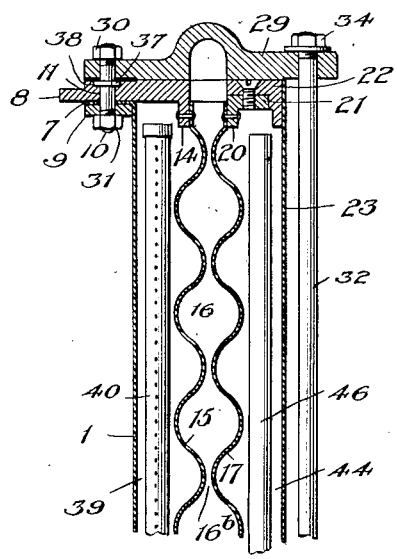
Fig. 2.
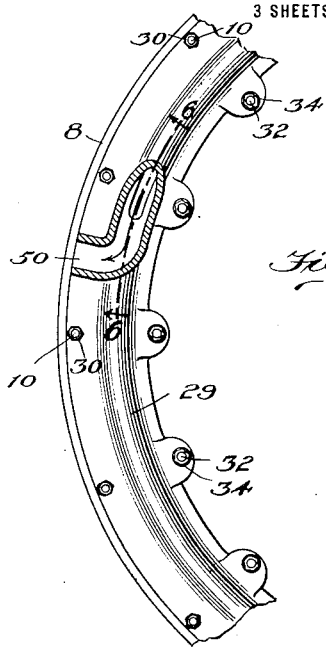
Fig. 3.
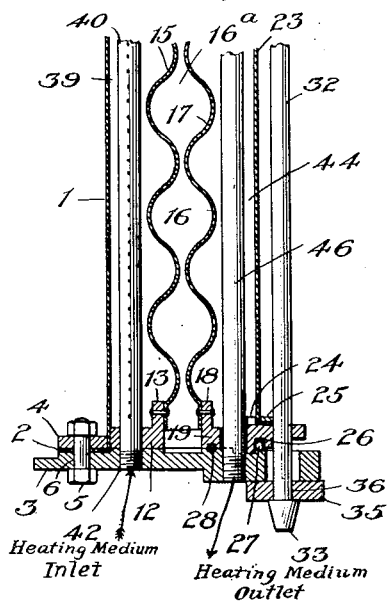
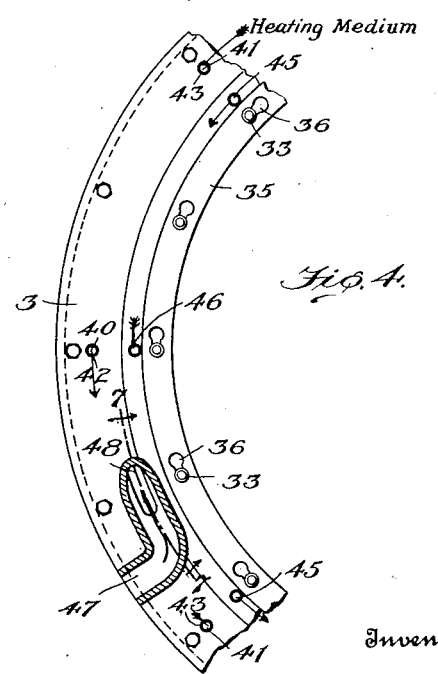
Fig. 4.
Inventor
William O. Rew
By Church & Church
his Attorneys W. O. REW.
APPARATUS FOR TREATING LIQUIDS.
APPLICATION FILED AUG. 24, 1915. RENEWED FEB. 20, 1920.
1,336,655.
Patented Apr. 13, 1920.
3 SHEETS—SHEET 3.
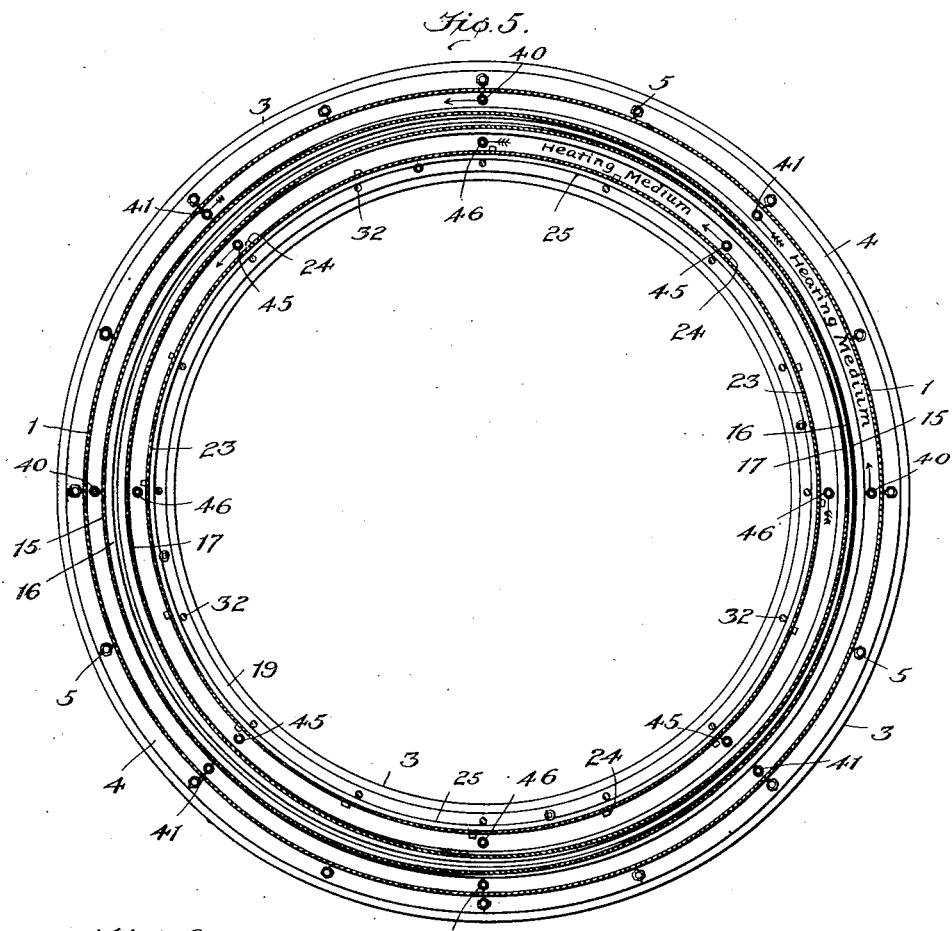
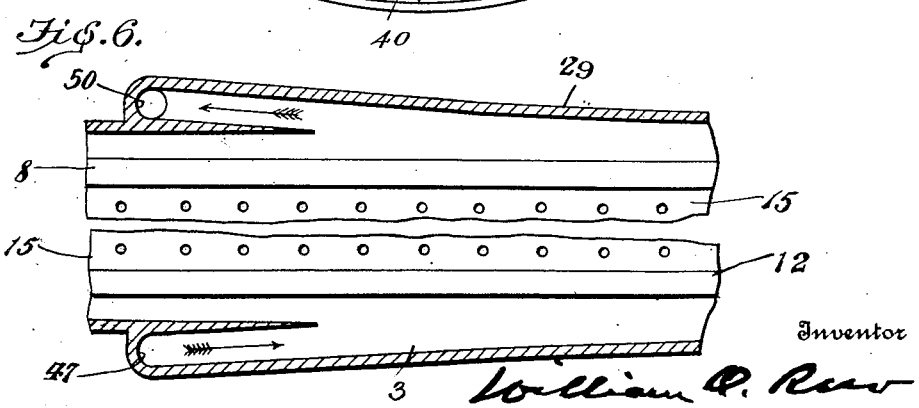

UNITED STATES PATENT OFFICE.

WILLIAM O. REW, OF EUREKA, CALIFORNIA, ASSIGNOR OF ONE-HALF TO CHESTER EARL GRAY, OF EUREKA, CALIFORNIA.

APPARATUS FOR TREATING LIQUIDS.

1,336,655.  Specification of Letters Patent.  Patented Apr. 13, 1920.

Application filed August 24, 1915, Serial No. 47,142. Renewed February 20, 1920. Serial No. 360,068.

*To all whom it may concern:*

Be it known that I, WILLIAM O. REW, a citizen of the United States, residing at Eureka, in the county of Humboldt and State of California, have invented certain new and useful Improvements in Apparatus for Treating Liquids; and I do hereby declare the following to be a full, clear, and exact description of the same, reference being had to the accompanying drawings, forming part of this specification, and to the figures and letters of reference marked thereon.

This invention relates generally to improvements in the treatment of liquids.

Although equally applicable to all cases wherein it is desired to change the temperature of a liquid by the action of a temperature changing medium, the invention is especially adapted for the pasteurizing of milk or subjecting it to the action of heat for a sufficient time to kill or render harmless the pathogenic micro-organisms in the milk. Hence, for convenience, the present description will be confined to the use of the invention in pasteurizing, and from this description a full understanding of the nature and objects of the invention will appear.

A preferred form of apparatus for carrying out the present method is illustrated in the accompanying drawings, in which:

Fig. 2 is a section through the walls of a preferred form of container or liquid treating chamber;

Fig. 3 is a top plan view, partly in section, of a portion of the container illustrated in Fig. 2;

Fig. 4 is a bottom plan view, partly in section, of a portion of the container illustrated in Fig. 2; and Fig. 5 is a transverse section taken on planes indicated by the line 5—5 of Fig. 1.

Fig. 6 is a fragmentary vertical section through the upper portion of the central passageway and showing the outlet illustrated in Fig. 3.

Fig. 7 is a similar view showing the inlet illustrated in Fig. 4.

Similar characters of reference in the several figures indicate the same parts.

Figure 1:
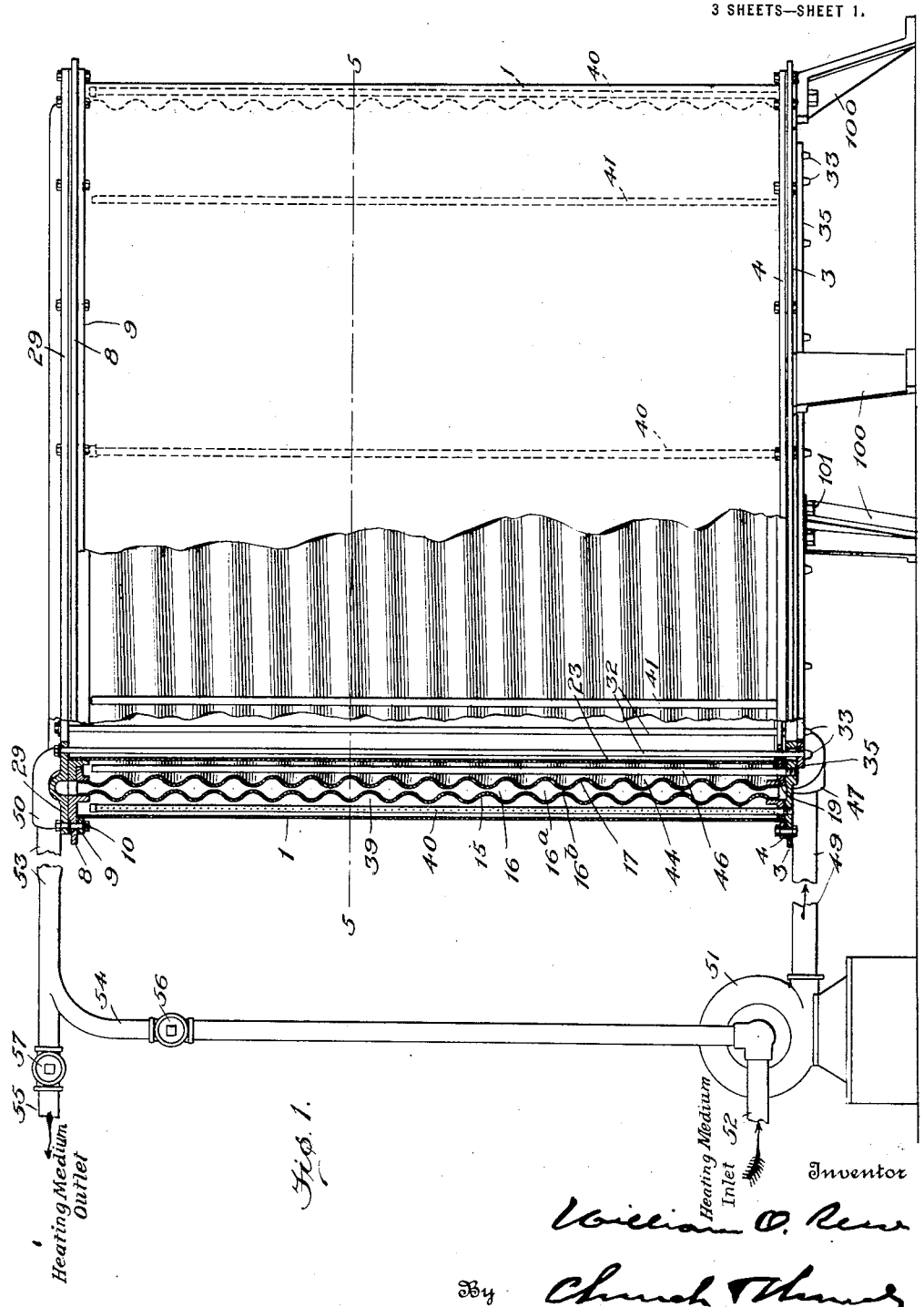
Figure 1 is a plan view, partly in section, of the apparatus.

The container for the liquid to be treated embodies in its construction an outer cylinder 1 having a bottom flange 2 by which the outer cylinder may be rested on the base or supporting ring 3, and clamped down thereupon by an insulating ring 4, and an annular series of clamping bolts 5, which extend through holes 6 in the base ring 3. At its upper end cylinder 1 is flanged outwardly as at 7, and clamped to an upper ring 8, by a clamping ring 9 and a series of clamping bolts 10 extending through corresponding holes 11 in said upper ring 9. Within outer cylinder 1 and suitably clamped to the upper face of bottom ring 3 is a ring 12 having an inner up-reaching annular flange 13. Upper ring 8 is provided with a depending flange 14. Secured at its upper and lower ends to the inner annular faces of the respective upper and lower flanges 14, 13, is a cylinder 15. Cylinder 15 is spirally-convoluted, as shown most clearly in Fig. 1, and the inner face of the cylinder forms the outer confining wall of a chamber or passage 16, through which the liquid to be treated is circulated. The inner confining wall of said liquid passage is formed by an inner similarly spirally-convoluted cylinder 17. The lower end of said cylinder is secured to the outer face of up-reaching flange 18 of an inner removable ring 19 which rests upon supporting ring 3 and the upper end of said cylinder is secured to the outer face of depending flange 20 of ring 21 which is securely fastened or clamped to inner upper ring 22. To the inner annular face of upper ring 22 is clamped the upper end of innermost cylinder 23. The lower end of innermost cylinder 23 which is preferably flanged, is clamped between a series of lugs 24 on ring 19 and a hold-down ring 25. An inner annular groove 26 is cut in ring 19, the vertical wall of said groove abutting against a series of lugs 27 which project upwardly from supporting ring 3. The engagement of the lugs 27 with the vertical wall of groove 26 prevents displacement of ring 19 and the parts resting thereon, when assembled in the position shown in Fig. 2. A suitable packing 28 is interposed between removable ring 19 and supporting ring 3 to prevent leakage of liquid from the chamber or passage 16 between outer and inner convoluted cylinders 15 and 17. Mounted on inner upper ring 22 is a cap ring 29. Said cap ring is detachably clamped to outer ring 8 by the series of bolts 10 extending respectively through alined holes in cap ring 29, ring 8 and clamping ring 9. The bolts are threaded at both ends and locked by upper and lower nuts 30 and 31.

The parts are further clamped in position by a series of king bolts 32, which pass at their upper ends through holes in cap 29 and at their lower ends through holes in removable ring 19 and supporting ring 3. Heads 33 are provided at the extreme lower ends of the bolts and to permit withdrawal of the bolts through supporting ring 3, the holes in said supporting ring are made large enough in diameter to receive the bolt heads 33. Nuts 34 are threaded on the upper ends of the respective bolts 32 and said nuts rest on cap ring 29 and permit tightening or loosening of the bolts when the parts are assembled. The bolts are locked at their lower ends by a locking ring 35 having key-hole slots 36 corresponding in number to the heads 33. Accordingly, it will be understood that the parts may be securely locked, by simply slipping locking ring 35 over the heads 33 of the bolts and turning said locking ring through an arc sufficient to bring the restricted portions of the slots in registry with the bolts 32 above the enlarged heads of the latter.

The above described arrangement permits a ready and quick withdrawal of one of the confining cylinders 15, 17 from the other, in the present instance, the inner confining cylinder 17 may be withdrawn from the outer confining cylinder 15. This is a considerable advantage in practice, since the chamber or passage between the two cylinders forms the circulating space for the liquid to be treated, and, when the apparatus is used for pasteurizing milk, for instance, the inner walls of the confining cylinders are subject to contamination very easily, due to deposits of the solid constituents of the circulated milk. Consequently, perfect sanitary conditions can be preserved only by frequent cleaning of the surfaces, which contact with the milk circulating in the passages. The apparatus is dismounted for cleaning purposes as follows:—From the foregoing description it will be noted that inner confining cylinder 17 and cylinder 23 are respectively secured at the upper ends to rings 21 and 22, which are movable relatively to upper outer ring 8. The lower supporting connections for the cylinders 17 and 23, namely, the ring 19 and hold-down ring 25 simply rest on supporting ring 3. Outer confining cylinder 15 and outer cylinder 1 are, however, secured at their lower ends to supporting ring 3 by bolts 5 and at their upper ends to ring 8. By unscrewing upper nuts 30 of bolts 10, loosening nuts 34, and turning locking ring 35 sufficient to bring the enlarged portions of key-hole slots 36 in registry with bolt heads 33, and by grasping cap 29, the entire inner structure of the container consisting of the inner confining cylinder 17, innermost cylinder 23 and their connections may be withdrawn from the outer structure, since the heads 33 of the bolts may pass through the enlarged portions of the key-hole slots 36 and engage the ring 19. Or the cap 29 may be first removed by unscrewing the nuts 30 and 34, and then lifting the cylinders 17 and 23 with their upper and lower rings, clear of the outer structure. The pipes 45 and 46 are rigidly secured to the lower ring 3 but are finished smooth on their outer surfaces to readily permit the withdrawal of the ring 19 which has a sliding fit with these pipes. The slight leakage that may occur by reason of this sliding fit between the pipes 45 and 46 and the ring 19 is of no consequence since the annular packing 28 prevents such leakage reaching the passage 16.

It should be noted that when the parts 17, 22, 23, 19 are removed the similar chamber 15, 8, 1, 12 is still closed and consequently the heating medium may still continue to flow despite the absence of the central and inner chambers, thus permitting the cleaning of the outer corrugated wall 15 of the path 16 while hot. When the parts of the container are thus disassembled, the inner surface of outer confining cylinder 15 is readily accessible for cleaning, and, likewise the outer surface of inner confining cylinder 17. To prevent bolts 10 from being displaced and locking ring 9 from falling away from ring 8, when nuts 30 are unscrewed, bolts 10 are each provided with locking collars 37 which fit into corresponding recesses 38 in ring 8. The entire container is supported from the ground upon stands or legs 100 secured to ring 3 by bolts 101.

When the parts are assembled, as shown in Fig. 2, and inner confining cylinder 17 is arranged within outer confining cylinder 15, a continuous spiral passage $16^a$ is provided, which spiral passage travels around between the two confining cylinders from the bottom to the top of the container. Between the convolutions of the spiral passages are formed restricted passages $16^b$, which permit currents or portions of the liquid flowing in the spiral passage $16^a$ to escape or flow axially of the spirally flowing body or current of liquid within the inner and outer confining cylinders 15, 17.

Between outer cylinder 1 and confining cylinder 15 is an annular chamber 39 for the reception of a treating liquid or temperature changing medium and with which are arranged inlet and exhaust pipes 40 and 41, preferably in alternation. Each inlet and exhaust pipe 40, 41 extends through or communicates with alined holes 42, 43, in rings 12, 3, whereby each pipe may communicate, with an exhaust or supply main, as the case may be. A similar annular chamber 44 is provided between confining cylinder 17 and cylinder 23, and arranged within said chamber is a series of alternate treating medium supply and exhaust pipes 45, 46, communicating at the bottom of the container with supply and exhaust mains (not shown).

The liquid to be treated is preferably introduced into the space 16 between cylinders 15 and 17 from the bottom of the container, and in a direction to maintain the flow within spiral passage 16ª and the flow in restricted passages 16ᵇ. For this purpose an inlet or nozzle 47 is provided in supporting plate 3, said inlet communicating with the lower convolution of spiral passage 16ª by a duct 48 (see Fig. 4) and with a liquid supply main 49 (see Fig. 1). The inlet or nozzle 47 is disposed tangentially to the spiral passage 16ª, so that the liquid entering through the nozzle is injected tangentially into the body of liquid between the confining cylinders 15 and 17, and the flow of the liquid is thus maintained. At its upper extremity passage 16ª communicates with a discharge outlet 50, preferably similar to inlet 47.

As shown in Fig. 1, liquid supply main 49 leads from a pump 51 by which the liquid may be injected under pressure through nozzle 47 into spiral passage 16ª. Pump 51 is supplied by a pipe 52. The discharged liquid passes through outlet 50 into discharge pipe 53 preferably having two branches 54, and 55. Branch 55 leads to a suitable discharge container (not shown) and branch 54 leads back to pump 51. The flow of liquid in both branches may be controlled by valves 56, 57. This provides an arrangement whereby discharged liquid may be united with the liquid under pressure, entering the body of liquid between the inner and outer confining walls through supply main 49 to correspondingly vary the temperature of the liquid finally discharged through pipe 55. The quantity of discharged liquid united with the liquid under pressure may be regulated by manipulation of valves 56, 57.

Assuming that the improved apparatus is to be utilized for pasteurizing milk, the operation is as follows:—The walls of confining cylinders 15 and 17 are heated by introducing hot water or water of condensation into the chambers 39 and 44. A pasteurizing temperature within the chambers is maintained by continuous circulation through the supply and exhaust pipes in each chamber.

The pump is placed in operation and milk is introduced through the tangential nozzle 47 into the space 16 between the confining cylinders 15 and 17, thereby producing a spirally moving body of milk between the two heated surfaces. The milk flows in a spiral path through the spiral passage 16ª and the flow of the milk is maintained by the milk continuously supplied under pressure tangentially to the inner and outer confining walls, i. e., through nozzle 47. The milk flows along the spiral passage, portions of it flowing into the restricted passages 16ᵇ between the convolutions of the spiral passage, where the milk is subjected to the concentrated effect of the heated walls of the cylinders, by reason of the reduced thickness of the milk currents in the restricted passages.

Before the milk in the restricted passages can be heated to a dangerously high temperature, it escapes from the restricted passage into the main passage so that there is practically no danger of cooking the milk or coagulating the albumen therein. In practice, the confining walls are made of sufficient height and diameter to provide a spiral passage of such length that the milk discharged through outlet 50 is remote from the supply and has been subjected to heat for a sufficient time to kill all of the pathogenic micro-organisms in the milk. All of the milk flowing between the confining walls is subjected to the action of the pasteurizing temperature and in addition, by the time the milk has been discharged practically all of it has been subjected to a concentrated heating effect in the restricted passages 16ᵇ. Consequently it is possible to reduce the heat of the confining walls 15 and 17 to nearly that of the milk discharged through outlet pipe 55. If it is found desirable to further heat the milk, portions of the discharge may be directed through pipe 54 by opening valve 56, back into the raw milk entering under pressure, and the temperature of the finally discharged milk regulated by the quantity of milk directed back to the supply.

What is claimed is:

1. In a fluid treating device, a pair of nested members providing a path for the liquid to be treated, the greatest diameter of the inner member being less than the smallest diameter of the outer member, means to maintain the members in spaced apart relation, a spiral corrugation on one of said members separating said path into a continuous enlarged spiral passage and a restricted passage between each of the convolutions of the spiral passage.

2. In a fluid treating device, a pair of members providing a path for the liquid to be treated, each having a spiral corrugation therein, means for maintaining the members in spaced apart relation with the valleys of the corrugations opposite each other, whereby the path is divided into a continuous enlarged spiral passage and a restricted passage between each of the convolutions of the spiral passage.

3. In a fluid treating device, a pair of telescoping members providing a path for the liquid to be treated, means for detachably maintaining the members in spaced apart relation, an enlargement on one of said members providing a continuous enlarged portion in said path for the liquid from one end of the member to the other, and means for forcing liquid through said enlarged portion and through the balance of the path.

4. In a fluid treating device, a pair of telescoping elements each consisting of a plurality of walls defining a fluid passage, the inner wall of the outer element and the outer wall of the inner element defining a path for the liquid to be treated, supporting members securing the walls in spaced apart relation and making said path fluid-tight, and means for forcing the liquid to be treated through said path.

5. In a fluid treating device, a plurality of walls defining a central passageway and a plurality of surrounding passageways, securing means holding said walls in pairs, and detachably holding said pairs together and making the central passageway fluid-tight, and means for providing a continuous flow of fluid under pressure through each of said passageways.

6. In a pasteurizing apparatus, a plurality of walls defining a central passageway for the fluid to be treated, and a plurality of surrounding passageways for temperature controlling fluid, and means for creating an independent flow of fluid therethrough, and means for permitting the flow of controlling fluid while the walls of the central passageway are being separated for cleaning.

7. An apparatus for treating liquids, comprising inner and outer spirally convoluted cylindrical walls arranged in juxtaposition to each other with the valleys of the convolutions of the respective walls disposed oppositely to each other whereby a chamber for the liquid to be treated is formed between said walls having relatively wide spiral passages alternating with relatively narrow spiral passages, means for injecting the liquid under pressure between said walls at one end of the latter and tangentially thereto, whereby the spiral flow of the liquid is maintained, means for applying a temperature changing medium to the outer surfaces of said walls, and an outlet for the treated liquid located at the other end of the walls.

8. An apparatus for treating liquids comprising inner and outer spirally convoluted cylindrical walls arranged in juxtaposition to each other with the valleys of the convolutions of the respective walls disposed oppositely to each other whereby a chamber for the liquid to be treated is formed between said walls having relatively wide spiral passages alternating with relatively narrow spiral passages, means for injecting the liquid between said walls at one end of the latter, means for applying a temperature changing medium to the outer surfaces of said walls, and an outlet for the treated liquid located at the other end of the walls.

9. An apparatus for treating liquids comprising inner and outer spirally convoluted cylindrical walls arranged in juxtaposition to each other with the valleys of the convolutions of the respective walls disposed oppositely to each other whereby a chamber for the liquid to be treated is formed between said walls having relatively wide spiral passages alternating with relatively narrow spiral passages, means for injecting the liquid between said walls at one end of the latter, means for applying a temperature changing medium to the outer surfaces of said walls, an outlet for the treated liquid located at the other end of the walls, and means for regulating the temperature of the treated liquid by uniting variable quantities of the discharged liquid with the untreated liquid.

10. In a liquid treating device, an outer container, an inner container arranged in juxtaposition thereto, said containers forming between them a chamber in which the liquid to be treated flows continuously, upper and lower closure members for the ends of the outer container, upper and lower closure members for the ends of the inner container, and means for detachably securing the containers together to seal said chamber, but permitting the containers to be disassembled as units.

11. In a liquid treating device, an outer fluid container consisting of two concentric walls and an upper and a lower ring forming respectively the top and bottom of the container, an inner container consisting of similar elements and spaced within the outer container to form a chamber therebetween; upper and lower caps closing the ends of the central chamber, and detachable means coöperating with said caps allowing the separation of the containers as units and permitting the cleaning of each wall of the central chamber.

12. In a liquid treating device, an outer fluid container having a corrugated inner wall, an inner fluid container having a corrugated outer wall, spaced from said corrugated inner wall and forming therewith a continuous enlarged spiral passage and a continuous spiral restricted passage permitting flow of liquid between proximate convolutions of the enlarged spiral passage, concentric rings forming the top and bottom of the containers, an upper cap provided with an orifice overlying the upper rings to close the top of the space between the containers, a lower cap supporting the lower rings and provided with an orifice, and means for forcing the liquid to be treated through the space between the containers, and for forcing temperature controlling fluid through each of the containers.

WILLIAM O. REW.